United States Patent Office

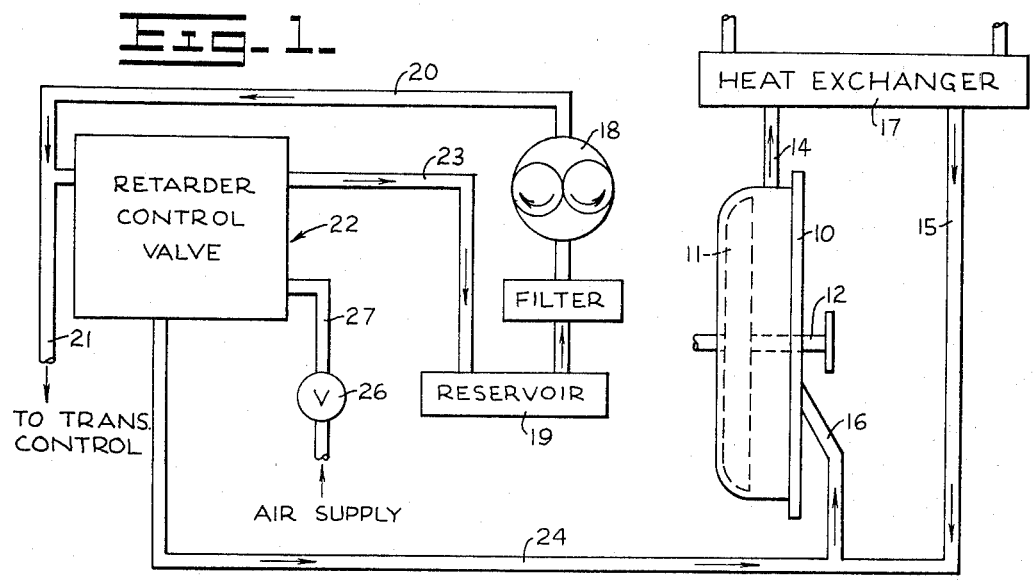
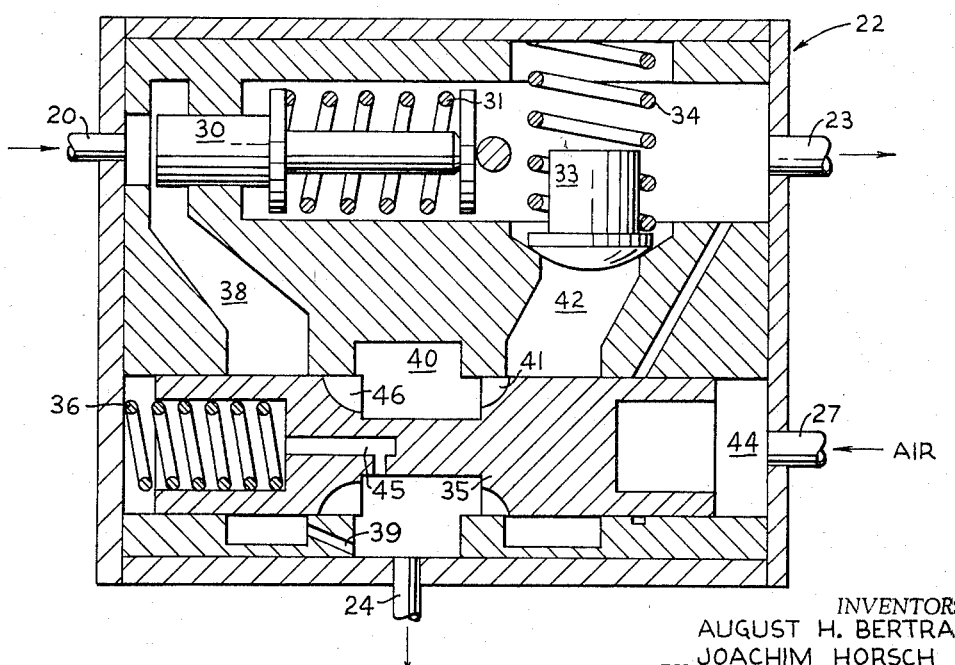

3,283,859
Patented Nov. 8, 1966

3,283,859
RETARDER CONTROL SYSTEM
August H. Bertram, Decatur, Joachim Horsch, Pekin, and Gerald D. Rohweder, Peoria, Ill., assignors to Caterpillar Tractor Co., Peoria, Ill., a corporation of California
Filed Sept. 17, 1964, Ser. No. 397,149
5 Claims. (Cl. 188—90)

This invention relates to fluid retarders of the kind employed to augment the action of brakes on large vehicles.

Some retarders, such for example as the one disclosed in the United States patent to Sieving 3,139,158, comprise a housing containing a rotor and stator with opposed vanes and means to charge the housing with oil under pressure to create resistance to movement of the rotor which is connected indirectly with the wheels of a vehicle. The same patent shows a load cylinder to charge the retarder with pressure. The cylinder contains oil which is forced by air under pressure into the retarder housing.

Retarders operate under high pressures, and despite the use of seals, usually leak considerably. This creates a necessity for replacement of oil in the load cylinder which is time consuming. Furthermore, failure to replace oil results in faulty operation.

It is therefore an object of the present invention to provide a retarder system which includes means for utilizing oil from the engine crankcase or transmission of a vehicle, and control means for regulating retarder action which will insure a constant supply of oil in the retarder and a constant safe volume and pressure of oil for actuation of other vehicle components.

Further and more specific objects and advantages of the invention are made apparent in the following specification wherein the invention is described in greater detail by reference to the accompanying drawing.

In the drawing:

FIG. 1 is a schematic view of the retarder and control system embodying the present invention; and FIG. 2 is a schematic sectional view of a retarder control valve used in the system of FIG. 1.

A retarder is shown at 10 in FIG. 1 with the rotor 11 thereof carried by a shaft 12 connected by means, not shown, with the ground engaging wheels of a vehicle so that retarding of the rotor 11 also retards or slows the speed of the vehicle. Fluid in the retarder is circulated through conduits 14, 15 and 16 and a heat exchanger 17 to dissipate the heat of friction created within the retarder. Pressure is supplied to the retarder system by a pump 18 which withdraws oil from a reservoir 19. This may be the sump of a vehicle transmission, and in this case oil from the same pump may be employed for actuating other components, such for example as the transmission controls. A line 20 leads from the pump to a line 21 which may lead to such transmission controls and a branch line leads to a retarder control valve shown at 22 through which oil may be directed either back to the reservoir by a line 23, or to the retarder circuit by a line 24. Air from any suitable source, not shown, is controlled by a valve 26 and directed by line 27 into the retarder control valve for opening the valve to permit pressure from the pump to be directed through line 24 and to the retarder.

The retarder control valve, which is shown in section in FIG. 2, contains three valve units. The first of these units is a valve element 30 urged toward a closed position by spring 31. This is referred to as a priority valve which insures against operation of the retarder except when there is ample pressure from the pump to insure operation of the transmission control. This valve will be set to open at approximately 300 p.s.i., and therefore pressure from the pump cannot be directed through the valve 22 to the retarder unless sufficient pressure exists in the line 21 to insure proper operation of the transmission control. A second valve is a relief valve shown at 33 urged toward a closed position by a spring 34. A third, or pressure regulating spool valve, is shown at 35. This valve normally urged to the right by a spring 36, in which position it is closed, as shown, can be opened by air under pressure entering through the line 27 and urging it toward the left.

In the inactive position of the retarder in which valve spool 35 is fully to the right a pressure of at least 300 p.s.i. is being received from the pump 18 and is holding the valve 30 open. The spool 35 is closed by the spring 36, but some of the oil entering the housing enters a chamber 38 and passes through a small orifice 39 into a chamber 40. In this position of the valve, chamber 40 communicates with the reservoir through chamber 42 and the line 23 under control of the check valve 33. The check valve has a setting of not more than 1 or 2 p.s.i. and maintains just sufficient back pressure in the housing to prevent draining of fluid from the retarder-heat exchanger circuit. This pressure is not sufficient to produce any noticeable retarding action, but does insure that the retarder will function promptly when it is pressurized. This check valve also insures the presence of a lubricant in the retarder and the circulation of this fluid from the retarder to the heat exchanger for cooling purposes at all times. During initial filling of the retarder, spool 35 is moved to the left by admitting any desired air pressure to a chamber 44 at one end of the valve spool through operator actuation of the air valve 26. Spool 35 is urged toward the left against the force of the spring 36 and against the pressure of oil in the spring chamber which is communicated thereto from the chamber 40 by a passageway 45. Since the pressure in the retarder inlet and chamber 40 is initially low the spool is moved toward the left to the extent that a first series of metering slots 46 are placed in communication with the source of high pressure fluid in chamber 38. The closed loop retarder-heat exchanger system is supplied this additional amount of fluid at a maximum rate of fill without lowering the pressure in line 20 below 300 p.s.i. and with a second series of metering slots 41 closed. A balanced condition prevails when the pressure of oil in the chamber of spring 36 plus the force of the spring attain a value which overcomes the force of air in chamber 44 sufficiently to open the second series of metering slots 41 slightly and bleed pressure back to the reservoir through relief check 33. At this point metering slots 46 are closed and the components assume the positions shown by FIG. 2 with the fluid passing through orifice 39 supplying the leakage make-up needs of the retarder and with the excess returning to reservoir 19 through metering slots 41 and check valve 33. If the make-up flow through orifice 39 is not sufficient to maintain a balanced condition as mentioned above, then the pressure in chamber 40 and the spring chamber would decrease allowing spool 35 to move leftwardly to close metering slots 41 and open metering slots 46. Under these circumstances an alternate state of balance would prevail wherein fluid would pass to the retarder circuit through orifice 39 and slots 46 and there would be no excess to be exhausted to reservoir 19 through chamber 42, check valve 33 and conduit 23.

While the system has been described with respect to an air actuated version of pressure regulating spool valve 35 it is to be understood that alternate methods of biasing the valve, such as manually regulating a spring force in conjunction with the right end of the valve, may be used without departing from the scope of the invention.

What is claimed is:

1. A retarder control system for directing oil under pressure from a source of supply to a closed retarder circuit comprising a normally closed valve between the supply and the retarder circuit, said valve including a spool reciprocable in a ported cylinder, a spring chamber and spring at one end of the cylinder urging the valve toward a closed position, means to apply a regulated force to the opposite end of the cylinder to open the valve, first passageway means to permit fluid to by-pass said valve and be admitted to the retarder circuit, and second passageway means to communicate the retarder circuit pressure to the spring chamber to oppose said force and attain a balanced state.

2. The combination of claim 1 including a return passage between the valve and the source of supply, and fluid metering means associated with a land of said spool located between the retarder circuit and the return passage.

3. The combination of claim 2 including a second fluid metering means associated with a second land of the spool and located between the source of supply and the retarder circuit.

4. The combination of claim 2 including a check valve in the return passage to insure the presence of fluid in the retarder circuit when the spool valve is closed.

5. A retarder control system for directing oil under pressure from a source of supply to a closed retarder circuit comprising a normally closed valve between the supply and the retarder, means permitting a limited flow to pass said closed valve, means for venting said flow, a check valve in the venting means to insure presence of oil at low pressure in the retarder circuit at all times, said normally closed valve including a spool reciprocable in a ported cylinder, a spring chamber and spring at one end of the cylinder urging the valve toward a closed position, means to direct air under pressure to the opposite end of the cylinder to open the valve, and means admitting oil under pressure flowing past the valve to the spring chamber to oppose the air pressure and attain a state of balance.

References Cited by the Examiner
UNITED STATES PATENTS

| | | | |
|---|---|---|---|
| 2,631,695 | 3/1953 | McGill | 188—90 |
| 2,990,919 | 7/1961 | Christenson et al. | 188—90 |
| 3,056,422 | 10/1962 | Abraham | 188—90 |
| 3,103,997 | 9/1963 | Shealy et al. | 188—90 |
| 3,146,863 | 9/1964 | Herbenar et al. | 188—90 |

FERGUS S. MIDDLETON, *Primary Examiner.*

MILTON BUCHLER, *Examiner.*

G. E. A. HALVOSA, *Assistant Examiner.*